US008145884B2

(12) United States Patent
Kissell

(10) Patent No.: US 8,145,884 B2
(45) Date of Patent: Mar. 27, 2012

(54) APPARATUS, METHOD AND INSTRUCTION FOR INITIATION OF CONCURRENT INSTRUCTION STREAMS IN A MULTITHREADING MICROPROCESSOR

(75) Inventor: Kevin D. Kissell, Le Bar sur Loup (FR)

(73) Assignee: MIPS Technologies, Inc., Mountain View, CA (US)

(*) Notice: Subject to any disclaimer, the term of this patent is extended or adjusted under 35 U.S.C. 154(b) by 56 days.

(21) Appl. No.: 12/605,201

(22) Filed: Oct. 23, 2009

(65) Prior Publication Data
US 2010/0115243 A1 May 6, 2010

Related U.S. Application Data

(63) Continuation of application No. 10/928,746, filed on Aug. 27, 2004, now Pat. No. 7,610,473, which is a continuation-in-part of application No. 10/684,350, filed on Oct. 10, 2003, now Pat. No. 7,376,954, and a continuation-in-part of application No. 10/684,348, filed on Oct. 10, 2003, now abandoned.

(60) Provisional application No. 60/502,358, filed on Sep. 12, 2003, provisional application No. 60/502,359, filed on Sep. 12, 2003, provisional application No. 60/499,180, filed on Aug. 28, 2003.

(51) Int. Cl.
G06F 9/30 (2006.01)
G06F 9/345 (2006.01)
G06F 9/38 (2006.01)
G06F 9/46 (2006.01)

(52) U.S. Cl. .............. 712/215; 712/228; 712/229
(58) Field of Classification Search .............. 712/215, 712/228, 229, 235, 244
See application file for complete search history.

(56) References Cited

U.S. PATENT DOCUMENTS
3,665,404 A 5/1972 Werner
(Continued)

FOREIGN PATENT DOCUMENTS
EP 0 256 149 B1 2/1988
(Continued)

OTHER PUBLICATIONS
Dictionary.com © 1999, 2002, 2005, 2009, 2011 Search Term: Operating System.*
(Continued)

Primary Examiner — Aimee Li
(74) Attorney, Agent, or Firm — Sterne, Kessler, Goldstein & Fox P.L.L.C.

(57) ABSTRACT

A fork instruction for execution on a multithreaded microprocessor and occupying a single instruction issue slot is disclosed. The fork instruction, executing in a parent thread, includes a first operand specifying the initial instruction address of a new thread and a second operand. The microprocessor executes the fork instruction by allocating context for the new thread, copying the first operand to a program counter of the new thread context, copying the second operand to a register of the new thread context, and scheduling the new thread for execution. If no new thread context is free for allocation, the microprocessor raises an exception to the fork instruction. The fork instruction is efficient because it does not copy the parent thread general purpose registers to the new thread. The second operand is typically used as a pointer to a data structure in memory containing initial general purpose register set values for the new thread.

11 Claims, 5 Drawing Sheets

U.S. PATENT DOCUMENTS

| | | | |
|---|---|---|---|
| 4,817,051 A | 3/1989 | Chang | |
| 4,843,541 A | 6/1989 | Bean et al. | |
| 4,860,190 A | 8/1989 | Kaneda et al. | |
| 5,159,686 A | 10/1992 | Chastain et al. | |
| 5,253,308 A * | 10/1993 | Johnson | 382/304 |
| 5,295,265 A | 3/1994 | Ducateau et al. | |
| 5,410,710 A | 4/1995 | Sarangdhar et al. | |
| 5,428,754 A | 6/1995 | Baldwin | |
| 5,499,349 A | 3/1996 | Nikhil et al. | |
| 5,511,192 A | 4/1996 | Shirakihara | |
| 5,515,538 A | 5/1996 | Kleiman | |
| 5,542,076 A | 7/1996 | Benson et al. | |
| 5,606,696 A | 2/1997 | Ackerman et al. | |
| 5,659,786 A | 8/1997 | George et al. | |
| 5,706,514 A | 1/1998 | Bonola | |
| 5,727,203 A | 3/1998 | Hapner et al. | |
| 5,742,822 A | 4/1998 | Motomura | |
| 5,758,142 A | 5/1998 | McFarling et al. | |
| 5,790,871 A | 8/1998 | Qureshi et al. | |
| 5,799,188 A | 8/1998 | Manikundalam et al. | |
| 5,812,811 A | 9/1998 | Dubey et al. | |
| 5,835,748 A | 11/1998 | Orenstein et al. | |
| 5,867,704 A | 2/1999 | Tanaka et al. | |
| 5,870,597 A * | 2/1999 | Panwar et al. | 712/230 |
| 5,892,934 A | 4/1999 | Yard | |
| 5,933,627 A | 8/1999 | Parady | |
| 5,944,816 A | 8/1999 | Dutton et al. | |
| 5,949,994 A | 9/1999 | Dupree et al. | |
| 5,961,584 A | 10/1999 | Wolf | |
| 6,061,710 A | 5/2000 | Eickemeyer et al. | |
| 6,088,787 A | 7/2000 | Predko | |
| 6,092,175 A * | 7/2000 | Levy et al. | 712/23 |
| 6,128,720 A | 10/2000 | Pechanek et al. | |
| 6,175,916 B1 | 1/2001 | Ginsberg et al. | |
| 6,189,093 B1 | 2/2001 | Ekner et al. | |
| 6,205,414 B1 | 3/2001 | Forsman et al. | |
| 6,205,543 B1 | 3/2001 | Tremblay et al. | |
| 6,223,228 B1 | 4/2001 | Ryan et al. | |
| 6,240,531 B1 | 5/2001 | Spilo et al. | |
| 6,253,306 B1 | 6/2001 | Ben-Meir et al. | |
| 6,286,027 B1 | 9/2001 | Dwyer et al. | |
| 6,330,656 B1 | 12/2001 | Bealkowski et al. | |
| 6,330,661 B1 | 12/2001 | Torii | |
| 6,401,155 B1 | 6/2002 | Saville et al. | |
| 6,480,845 B1 | 11/2002 | Egolf et al. | |
| 6,560,626 B1 | 5/2003 | Hogle et al. | |
| 6,591,379 B1 | 7/2003 | LeVine et al. | |
| 6,643,759 B2 | 11/2003 | Andersson et al. | |
| 6,658,447 B2 * | 12/2003 | Cota-Robles | 718/103 |
| 6,668,308 B2 | 12/2003 | Barroso et al. | |
| 6,671,791 B1 | 12/2003 | McGrath | |
| 6,675,192 B2 | 1/2004 | Emer et al. | |
| 6,687,812 B1 | 2/2004 | Shimada | |
| 6,697,935 B1 | 2/2004 | Borkenhagen et al. | |
| 6,738,796 B1 | 5/2004 | Mobini | |
| 6,779,065 B2 | 8/2004 | Murty et al. | |
| 6,877,083 B2 | 4/2005 | Arimilli et al. | |
| 6,889,319 B1 | 5/2005 | Rodgers et al. | |
| 6,907,517 B2 * | 6/2005 | Ohsawa et al. | 712/216 |
| 6,920,634 B1 | 7/2005 | Tudor | |
| 6,922,745 B2 | 7/2005 | Kumar et al. | |
| 6,925,550 B2 | 8/2005 | Sprangle et al. | |
| 6,952,827 B1 | 10/2005 | Alverson et al. | |
| 6,957,432 B2 | 10/2005 | Ballantyne | |
| 6,971,103 B2 | 11/2005 | Hokenek et al. | |
| 6,986,140 B2 | 1/2006 | Brenner et al. | |
| 6,993,598 B2 | 1/2006 | Pafumi et al. | |
| 7,020,879 B1 | 3/2006 | Nemirovsky et al. | |
| 7,031,992 B2 | 4/2006 | Khan et al. | |
| 7,065,094 B2 | 6/2006 | Petersen et al. | |
| 7,069,421 B1 | 6/2006 | Yates, Jr. et al. | |
| 7,073,042 B2 | 7/2006 | Uhlig et al. | |
| 7,082,601 B2 * | 7/2006 | Ohsawa et al. | 717/149 |
| 7,093,106 B2 | 8/2006 | Ambekar et al. | |
| 7,127,561 B2 | 10/2006 | Hill et al. | |
| 7,134,124 B2 | 11/2006 | Ohsawa et al. | |
| 7,152,170 B2 | 12/2006 | Park | |
| 7,181,600 B1 | 2/2007 | Uhler | |
| 7,185,183 B1 | 2/2007 | Uhler | |
| 7,185,185 B2 | 2/2007 | Joy et al. | |
| 7,203,823 B2 | 4/2007 | Albuz et al. | |
| 7,216,338 B2 | 5/2007 | Barnett et al. | |
| 7,243,345 B2 * | 7/2007 | Ohsawa et al. | 717/149 |
| 7,275,246 B1 | 9/2007 | Yates, Jr. et al. | |
| 7,321,965 B2 | 1/2008 | Kissell | |
| 7,376,954 B2 | 5/2008 | Kissell | |
| 7,386,636 B2 | 6/2008 | Day et al. | |
| 7,418,585 B2 | 8/2008 | Kissell | |
| 7,424,599 B2 | 9/2008 | Kissell | |
| 7,428,732 B2 | 9/2008 | Sandri et al. | |
| 7,434,224 B2 | 10/2008 | Lescouet et al. | |
| 7,594,089 B2 | 9/2009 | Vishin et al. | |
| 7,600,135 B2 | 10/2009 | Jones | |
| 7,610,473 B2 | 10/2009 | Kissell | |
| 7,627,770 B2 | 12/2009 | Jones | |
| 7,657,683 B2 | 2/2010 | Sridhar et al. | |
| 7,665,088 B1 | 2/2010 | Bugnion et al. | |
| 7,676,660 B2 | 3/2010 | Kissell | |
| 7,676,664 B2 | 3/2010 | Kissell | |
| 7,689,867 B2 | 3/2010 | Rosenbluth et al. | |
| 7,694,304 B2 | 4/2010 | Kissell | |
| 7,711,931 B2 | 5/2010 | Kissell | |
| 7,725,689 B2 | 5/2010 | Kissell | |
| 7,725,697 B2 | 5/2010 | Kissell | |
| 7,730,291 B2 | 6/2010 | Kissell | |
| 7,836,450 B2 | 11/2010 | Kissell | |
| 7,849,297 B2 | 12/2010 | Kissell | |
| 7,870,553 B2 | 1/2011 | Kissell | |
| 2001/0004755 A1 * | 6/2001 | Levy et al. | 712/217 |
| 2001/0034751 A1 | 10/2001 | Eto et al. | |
| 2001/0052053 A1 | 12/2001 | Nemirovsky et al. | |
| 2001/0056456 A1 * | 12/2001 | Cota-Robles | 709/103 |
| 2002/0016869 A1 | 2/2002 | Comeau et al. | |
| 2002/0083173 A1 | 6/2002 | Musoll et al. | |
| 2002/0083278 A1 | 6/2002 | Noyes | |
| 2002/0091915 A1 | 7/2002 | Parady | |
| 2002/0103847 A1 | 8/2002 | Potash | |
| 2002/0147760 A1 | 10/2002 | Torii | |
| 2002/0174318 A1 | 11/2002 | Stuttard et al. | |
| 2003/0014471 A1 | 1/2003 | Ohsawa et al. | |
| 2003/0014472 A1 * | 1/2003 | Ohsawa et al. | 709/107 |
| 2003/0014473 A1 * | 1/2003 | Ohsawa et al. | 709/107 |
| 2003/0018684 A1 * | 1/2003 | Ohsawa et al. | 709/102 |
| 2003/0028755 A1 * | 2/2003 | Ohsawa et al. | 712/216 |
| 2003/0074545 A1 | 4/2003 | Uhler | |
| 2003/0079094 A1 | 4/2003 | Rajwar et al. | |
| 2003/0093652 A1 | 5/2003 | Song | |
| 2003/0105796 A1 | 6/2003 | Sandri et al. | |
| 2003/0115245 A1 | 6/2003 | Fujisawa | |
| 2003/0126416 A1 | 7/2003 | Marr | |
| 2003/0225816 A1 | 12/2003 | Morrow et al. | |
| 2004/0015684 A1 | 1/2004 | Peterson | |
| 2004/0073910 A1 | 4/2004 | Hokenek et al. | |
| 2004/0139306 A1 | 7/2004 | Albuz et al. | |
| 2005/0033889 A1 | 2/2005 | Hass et al. | |
| 2005/0050305 A1 | 3/2005 | Kissell | |
| 2005/0050395 A1 | 3/2005 | Kissell | |
| 2005/0055504 A1 | 3/2005 | Hass et al. | |
| 2005/0120194 A1 | 6/2005 | Kissell | |
| 2005/0125629 A1 | 6/2005 | Kissell | |
| 2005/0125795 A1 | 6/2005 | Kissell | |
| 2005/0240936 A1 | 10/2005 | Jones et al. | |
| 2005/0251613 A1 | 11/2005 | Kissell | |
| 2005/0251639 A1 | 11/2005 | Vishin et al. | |
| 2006/0161421 A1 | 7/2006 | Kissell | |
| 2006/0161921 A1 | 7/2006 | Kissell | |
| 2006/0190945 A1 | 8/2006 | Kissell | |
| 2006/0190946 A1 | 8/2006 | Kissell | |
| 2006/0195683 A1 | 8/2006 | Kissell | |
| 2006/0206686 A1 | 9/2006 | Banerjee et al. | |
| 2007/0043935 A2 | 2/2007 | Kissell | |
| 2007/0044105 A2 | 2/2007 | Kissell | |
| 2007/0044106 A2 | 2/2007 | Kissell | |
| 2007/0106887 A1 | 5/2007 | Kissell | |
| 2007/0106988 A1 | 5/2007 | Kissell | |
| 2007/0106989 A1 | 5/2007 | Kissell | |
| 2007/0106990 A1 | 5/2007 | Kissell | |

| | | | |
|---|---|---|---|
| 2007/0186028 | A2 | 8/2007 | Kissell |
| 2008/0140998 | A1 | 6/2008 | Kissell |
| 2011/0040956 | A1 | 2/2011 | Kissell |

FOREIGN PATENT DOCUMENTS

| | | |
|---|---|---|
| EP | 0725334 | 8/1996 |
| EP | 0917057 | 5/1999 |
| EP | 1089173 | 4/2001 |
| JP | 8-171494 A | 7/1996 |
| JP | 8-249195 | 9/1996 |
| JP | 2003-029984 A | 1/2003 |
| JP | 2003-030050 A | 1/2003 |
| JP | 2007-504536 | 3/2007 |
| WO | WO 0153935 | 7/2001 |
| WO | WO 03/019360 | 3/2003 |
| WO | WO 2005/022385 | 3/2005 |

OTHER PUBLICATIONS

Haggander, D. et al., "Optimizing Dynamic Memory Management in a Multithreaded Application Executing on a Multiprocessor," *Proceedings of the International Conference on Parallel Processing*, Aug. 10-14, 1998, pp. 262-269.
Office Communication, dated Apr. 14, 2010, for U.S. Appl. No. 11/313,272, filed Dec. 20, 2005, 12 pages.
Office Communication, dated Jul. 6, 2009, for U.S. Appl. No. 11/615,960, filed Dec. 23, 2006, 16 pages.
Notice of Allowance, dated Jan. 15, 2010, for U.S. Appl. No. 11/615,960, filed Dec. 23, 2006, 8 pages.
Office Communication, dated Oct. 16, 2009, for U.S. Appl. No. 11/615,963, filed Dec. 23, 2006, 5 pages.
Notice of Allowance, dated Jan. 19, 2010, for U.S. Appl. No. 11/615,963, filed Dec. 23, 2006, 7 pages.
Office Communication, dated Oct. 20, 2009, for U.S. Appl. No. 11/615,964, filed Dec. 23, 2006, 5 pages.
Notice of Allowance, dated Jan. 12, 2010, for U.S. Appl. No. 11/615,964, filed Dec. 23, 2006, 6 pages.
Notice of Allowance, dated Oct. 16, 2009, for U.S. Appl. No. 11/615,965, filed Dec. 23, 2006, 6 pages.
Sunsoft, Multithreaded Programming Guide, 1995, Sunsoft, A Sun Microsystems, Inc. Business. Mountainview, CA.
Sunsoft, Multithreaded Programming Guide, 1995, Sunsoft, A Sun Microsystems, Inc. Business. Mountainview, CA, pp. 6, 12-13, 22-34 and 87.
Smith, Burton. "From Here to Petaflops." Keynote Address, Petaflops-systems Operations Working Review, (POWR), Bodega Bay, California, Jun. 1998.
Patterson et al. "Computer Organization & Design: The Hardware/Software Interface," 1998, Morgan Kaufmann Publishers, Inc. Second Edition, pp. 592-593.
Silberschatz et al. "Operating Systems Concepts." Addison-Wesley Publishing Company, Fourth Edition, pp. 267-269, 271-272, 275.
Free On-Line Dictionary of Computing. © 1994. www.foldoc.org Search term: exception handler.
Heuring, Vincent P. and Jordan, Harry F. "Computer Systems and Architecture". Reading, Mass.: Addison Wesley Longman, Inc., © 1997. pp. 35-37.
Agarwal, A. et al., "APRIL: A Processor Architecture for Multiprocessing," ACM SIGARCH Computer Architecture News, AMC, vol. 18, Issue 3a, pp. 104-114, Jun. 1990.
Culler, D.E., et al., Two Fundamental Limits on Dataflow Multiprocessing, 1993, Report No. UCB/CSD 92/716, pp. 1-14.
English Translation of Notice of Rejection for Japanese Patent Application No. 2006-524900, dated Nov. 28, 2008, 4 pages.
English Translation of Notice of Rejection for Japanese Patent Application No. 2006-524929, dated Nov. 28, 2008, 4 pages.
English Translation of Notice of Rejection for Japanese Patent Application No. 2006-524961, dated Nov. 28, 2008, 3 pages.
English Abstract of Japanese Patent Publication No. 2007-504536, published Mar. 1, 2007, 1 page.
English Abstract of Japanese Patent Publication No. 8-249195, published Sep. 27, 1996, 1 page.
Kane, G. and Heinrich, J., *MIPS RISC Architecture*, Prentice Hall, Upper Saddle River, New Jersey (1992). (entire book submitted).
Kissell, K.D., *MIPS MT: A Multithreaded RISC Architecture for Embedded Real-Time Processing*, "High Performance Embedded Architectures and Compilers," Spring, vol. 4917/2008, pp. 9-21, 2008.
Kwak, H. et al., "Effects of Multithreading on Cache Performance," Computers, IEEE Transaction on, IEEE, vol. 48, Issue 2, pp. 176-184, Feb. 1999.
Lee, B. et al., "Simulation Study of Multithreaded Virtual Processor," IASTED International Conference on Parallel and Distributed Systems (Euro-PDS), pp. 1-6, Jul. 3, 1998.
MIPS32® Architecture for Programmers, vol. III: The MIPS32® Privileged Resource Architecture, Revision 2.50, Jul. 1, 2005, MIPS Technologies, Inc., 137 pages.
MIPS32® Architecture for Programmers, vol. IV-f: The MIPS® MT Application-Specific Extension to the MIPS32® Architecture, Revision 1.00, Sep. 28, 2005, MIPS Technologies, Inc., 83 pages.
Sweetman, D., See MIPS Run, Morgan Kaufmann Publishers, San Francisco, CA (2002). (entire book submitted).
Teller et al., Locating Multiprocessor TLBs at Memory, IEEE, Proc. of the Twenty-Seventh Annual Hawaii International Conference on System Sciences, 1994, pp. 554-563.
Thiébaut, D. et al., Improving Disk Cache Hit-Ratios Through Cache Partitioning, IEEE Transactions on Computers, vol. 41, No. 6 (1992), pp. 665-676.
Office Communication, dated Jun. 21, 2007, for U.S. Appl. No. 10/929,097, filed Aug. 27, 2004, 18 pages.
Office Communication, dated Feb. 17, 2009, for U.S. Appl. No. 10/929,102, filed Aug. 27, 2004, 32 pages.
Office Communication, dated Oct. 12, 2006, for U.S. Appl. No. 10/929,342, filed Aug. 27, 2004, 26 pages.
Office Communication, dated Mar. 22, 2007, for U.S. Appl. No. 10/929,342, filed Aug. 27, 2004, 22 pages.
Office Communication, dated Apr. 6, 2007, for U.S. Appl. No. 10/954,988, filed Sep. 30, 2004, 8 pages.
Office Communication, dated Jan. 9, 2008, for U.S. Appl. No. 10/954,988, filed Sep. 30, 2004, 9 pages.
Office Communication, dated Jul. 29, 2008, for U.S. Appl. No. 10/954,988, filed Sep. 30, 2004, 8 pages.
Office Communication, dated Mar. 5, 2009, for U.S. Appl. No. 10/954,988, filed Sep. 30, 2004, 5 pages.
Office Communication, dated Dec. 19, 2006, for U.S. Appl. No. 10/955,231, filed Sep. 30, 2004, 19 pages.
Office Communication, dated Aug. 9, 2007, for U.S. Appl. No. 10/955,231, filed Sep. 30, 2004, 23 pages.
Office Communication, dated Mar. 6, 2007, for U.S. Appl. No. 11/330,914, filed Jan. 11, 2006, 21 pages.
Office Communication, dated Jul. 20, 2007, for U.S. Appl. No. 11/330,914, filed Jan. 11, 2006, 27 pages.
Office Communication, dated May 15, 2008, for U.S. Appl. No. 11/615,960, filed Dec. 23, 2006, 17 pages.
Office Communication, dated Dec. 8, 2008, for U.S. Appl. No. 11/615,960, filed Dec. 23, 2006, 15 pages.
Office Communication, dated Apr. 10, 2009, for U.S. Appl. No. 11/615,960, filed Dec. 23, 2006, 16 pages.
Office Communication, dated Oct. 17, 2008, for U.S. Appl. No. 11/615,963, filed Dec. 23, 2006, 16 pages.
Office Communication, dated Apr. 3, 2009, for U.S. Appl. No. 11/615,963, filed Dec. 23, 2006, 15 pages.
Office Communication, dated Oct. 15, 2008, for U.S. Appl. No. 11/615,964, filed Dec. 23, 2006, 18 pages.
Office Communication, dated Apr. 13, 2009, for U.S. Appl. No. 11/615,964, filed Dec. 23, 2006, 16 pages.
Office Communication, dated Oct. 16, 2008, for U.S. Appl. No. 11/615,965, filed Dec. 23, 2006, 17 pages.
Office Communication, dated Apr. 9, 2009, for U.S. Appl. No. 11/615,965, filed Dec. 23, 2006, 16 pages.
Office Communication, dated Dec. 22, 2008, for U.S. Appl. No. 11/949,603, filed Dec. 3, 2007, 8 pages.
Zilles, Craig B. et al. "The Use of Multithreading for Exception Handling." micro, p. 219, 32nd Annual International Symposium on Microarchitecture, 1999.

MIPS32™ Architecture for Programmers vol. III The MIPS32™ Instruction Set. Revision 2.00. pp. 231 & 311. Document No. MD00086. Jun. 9, 2003. MIPS Technologies, Inc.

Dorai, Gautham K. et al. "Transparent Threads: Resource Sharing in SMT Processors for High Single-Thread Performance." Proceedings of the International Conference on Parallel Architectures and Compilation Techniques 2002.

Kissell, Kevin D. "Microprocessor Forum (MPF) Conference Program Presentation: Architectural Extensions to the MIPS Architecture for High-Performance Embedded Systems," Oct. 15, 2003.

(webpage) Cray MTA-2 Historical Technical Papers, http://www.cray.com/products/programs/mta_2/resources.html. (Mar. 12, 2005), (formerly http://www.cray.com/products/systems/mta/psdocs.html (Jul. 2, 2004)).

Zaslavsky, Leonid et al. "A Scalable Approach for Solving Irregular Sparse Linear Systems on the Tera MTA Multithreaded Parallel Shared-Memory." Ninth SIAM Conference on Parallel Processing for Scientific Computing, San Antonio, TX Mar. 1999.

Briggs, Preston. "Tuning the BLAS for the Tera." Workshop on Multithreaded Execution, Architecture and Compilation. (MTEAC 98), Jan. 1998.

Alverson, Gail et al., "Scheduling on the Tera MTA." IPPS '95 Workshop on Job Scheduling Strategies for Parallel Processing, Santa Barbara, CA, Apr. 1995, and in D.G. Feitelson and L. Rudolph, editors, Job Scheduling Strategies for Parallel Processing, Lecture Notes in Computer Science vol. 949, pp. 19-44, Sorunger-Verlag 1995.

Smith, Burton. "Folklore and Reality in High Performance Computing Slide Presentation." 1995.

Smith, Burton. "The Quest for General-Purpose Parallel Computing." 1994.

Alverson, Gail et al. "Exploiting Heterogeneous Parallelism on a Multithreaded Multiprocessor." $6^{th}$ ACM International Conference on Supercomputing, Washington DC, Jul. 1992.

Callahan, David. "Recognizing and Parallezing Bounded Recurrences." Fourth Workshop on Languages and Compilers for Parallel Computing. pp. 169-184. Aug. 1991.

Callahan, David et al. "Register Allocation via Hierarchical Graph Coloring." ACM SIGPLAN '91 Conference on Programming Language Design and Implementation, Jun. 1991.

Alverson, Robert. "Integer Division Using Reciprocals." $10^{th}$ IEEE Symposium on Computer Arithmetic, Jun. 1991.

Callahan, David et al. "Improving Register Allocation for Subscripted Variables." ACM SIGPLAN Conference on Programming Language Design and Implementation, Jun. 1990.

Alverson, Robert et al. "The Tera Computer System." ACM International Conference on Supercomputing, pp. 1-6, Jun. 1990.

Smith, Burton. "The End of Architecture." Keynote Address, $17^{th}$ Annual Symposium on Computer Architecture, Seattle, Washington, May 1990.

Alverson, Gail et al. "A Future-Based Parallel Language for a General Purpose Highly Parallel Computer." Languages and Compilers for Parallel Computing. pp. 95-113, MIT Press, Cambridge, Massachusetts, 1990.

"MIT Alewife Project: Home Page." Retrieved from URL: http://catfish.csail.mit.edu/alewife/ on Jul. 2, 2004.

Arvin D. and R.A. Innaucci. "Two Fundamental Issues in Multiprocessing." in Proc. of DEVLF-Conf. 1987 on Par.Proc.in Science and Eng., Bonn-Bad Godesberg, W. Germany, Jun. 1987.

Engelschall, R.S., "pth GNU Portable Threads," Pth Manual, Online! Feb. 17, 2003, pp. 1-31, XP002315713.

Ishihara et al., "A Comparison of Concurrent Programming and Cooperative Multithreading," EURO-PAR 2000 Parallel Processing. $6^{TH}$ International EURO-PAR Conference. Proceedings (Lecture Notes in Computer Science vol. 1900) Springer-Verlag Berlin, Germany, Sep. 1, 2000, pp. 729-738, XP002315714, ISBN: 3-540-67956-1.

Frees, W., "Teilzeitarbeit Im Proxessor," Electronik, Franzts Verlag GMBH. Munche, DE, vol. 45, No. 9, Apr. 30, 1996, pp. 100-106, XP000595386, ISSN: 0013-5658 (English-language version of the search report or action which indicates the degree of relevance found by the foreign office is appended.).

Scheidhauer, Ralf, "Design, Implementierung and Evaluierung einer virtuellen Maschine fur Oz," Online! Dec. 1998, Dissertation, Saarbrucken, (English-language version of the search report or action which indicates the degree of relevance found by the foreign office is appended.).

Mehl et al., "An Abstract Machine for Oz," Research Report RR-95-08, Online!, Jun. 1995, pp. 1-23, Kaiserslautern Saarbrucken, ISSN 0946-008.

Unger et al., "Utilising Parallel Resources by Speculation," Parallel and Distributed Processing, 1999. PDP'00. Proceedings of the Seventh Euromicro Workshop on Funchal, Portugal Feb. 3-5, 1999, Los Alamitos, CA, USA, IEEE Computing Society, Feb. 3, 1999, pp. 339-343.

Tsai et al: "The Superthreaded Architecture: Thread Pipelining with Run-Time Data Dependence Checking and Control Speculation," Parallel Architectures and Compilation Techniques, 1996, Proceedings of the 1996 Conference in Boston, MA, USA Oct. 20-23, 1996, Los Alamitos, CA, USA, IEEE Comput. Soc., Oct. 20, 1996, pp. 35-46.

Popov, Konstantin: "A Parallel Abstract Machine for the Thread-Based Concurrent Language Oz," Workshop on Parallism and Implementation of Technology for Constraint Logic Programming Languages, Sep. 1997, pp. 1-25.

Bolychevsky et al. "Dynamic Scheduling in RISC Architectures." IEEE Proceedings Computers and Digital Techniques, vol. 143, No. 5. Sep. 24, 1996. pp. 309-317.

Marr et al. Hyper-Threading Technology. Intel Technology Journal, Feb. 14, 2002, vol. 6, No. 1, Intel Corporation, USA.

The Ubicom IP3023™ Wireless Network Processor; "A Next Generation Packet Processor for Wireless Networking"; Apr. 15, 2003, UBICOM, 635 Clyde Ave. Mountain View, CA 94043.

Ungerer et al., "A Survey of Processors with Explicit Multithreading"; ACM Computing Surveys, vol. 35, No. 1, Mar. 2003, pp. 29-63; Institute of Computer Science, University of Augsburg, Eichleitnerstrasse 30, D-86135 Augsburg, Germany.

David Fotland; A Multithreaded Wireless Network Processor with Software I/O, Embedded Processor Forum, Jun. 18, 2003; www.MDRonline.com.

Intel Technology Journal, vol. 8, issue 01, Feb. 14, 2002, ISSN 1535766X; Hyper-Threading Technology.

Carter et al., "Performance and Programming Experience on the Tera MTA", Tera Computer Corporation-SIAM Conference on Parallel Processing, Mar. 1999.

Alverson et al., "Tera Hardware-Software Cooperation," Tera Computer Corporation-Proceedings of the IEEE/ACM SC97 Conference, Nov. 15-21, 1997, San Jose, CA.

"Multithreaded Programming Guide", Sunsoft-A Sun Microsystems, Inc, Business; 2550 Mountain View, CA 94043.

Hennessy, John L. and Patterson, David A. "Computer Architecture a Quantitative Approach". Second Edition. San Francisco, CA: Morgan Kaufmann Publishers, Inc., © 1996. pp. 70-73 and 87-89.

Culler, D.E. et al., "Parallel Computer Architecture: A hardware/software approach," pp. 438-441, under sections "6.6.3 Translation Lookaside Buffer Coherence" published 1999.

Davidson and Fraser, "The Design and Optimization of a Retargettable Peephole Optimizer," ACM Trans. on Programming Languages and Sytems, vol. 2, No. 2, pp. 191-202, Apr. 1980.

English Translation of Notice of Regjection for Japanese Patent Application No. 2006-524868, mailed Jun. 15, 2010, 3 pages.

Office Communication, dated Jan. 10, 2011, for U.S. Appl. No. 11/313,296, filed Dec. 20, 2005, 12 pages.

Office Communication, dated Jun. 21, 2011, for U.S. Appl. No. 11/313,296, filed Dec. 20. 2005, 14 pages.

Notice of Allowance, dated Jul. 13, 2010, for U.S. Appl. No. 11/330,915, filed Jan. 11, 2006, 15 pages.

Notice of Allowance, dated Sep. 15, 2010, for U.S. Appl. No. 11/330,916, filed Jan. 11, 2006, 24 pages.

* cited by examiner

APPARATUS, METHOD AND INSTRUCTION FOR INITIATION OF CONCURRENT INSTRUCTION STREAMS IN A MULTITHREADING MICROPROCESSOR

CROSS REFERENCE TO RELATED APPLICATIONS

This application is a continuation of U.S. patent application Ser. No. 10/928,746 filed on Aug. 27, 2004 (issued as U.S. Pat. No. 7,610,473), which is a continuation-in-part of U.S. application Ser. No. 10/684,350 filed Oct. 10, 2003 (issued as U.S. Pat. No. 7,376,954) and U.S. application Ser. No. 10/684,348, filed Oct. 10, 2003 now abandoned, which claim benefit under 35 U.S.C. §119(e) to U.S. Provisional Application No. 60/502,358 filed Sep. 12, 2003, U.S. Provisional Application No. 60/502,359 filed Sep. 12, 2003, and U.S. Provisional Application No. 60/499,180 filed Aug. 28, 2003, all of which are incorporated herein by reference in their entirety.

This application is related to U.S. application Ser. No. 10/929,342 filed Aug. 27, 2004 (issued as U.S. Pat. No. 7,321,965), and to U.S. application Ser. No. 10/929,102 filed Aug. 27, 2004 (issued as U.S. Pat. No. 7,694,304), and to U.S. application Ser. No. 10/929,097 filed Aug. 27, 2004 (issued as U.S. Pat. No. 7,424,599), all of which are incorporated herein by reference in their entirety.

BACKGROUND OF THE INVENTION

1. Field of the Invention

The present invention relates in general to the field of multithreaded processors, and particularly to instructions for generating new threads of execution in a multithreaded processor.

2. Background Art

Microprocessor designers employ many techniques to increase their performance. Most microprocessors operate using a clock signal running at a fixed frequency. Each clock cycle the circuits of the microprocessor perform their respective functions. According to Hennessy and Patterson, the true measure of a microprocessor's performance is the time required to execute a program or collection of programs. From this perspective, the performance of a microprocessor is a function of its clock frequency, the average number of clock cycles required to execute an instruction (or alternately stated, the average number of instructions executed per clock cycle), and the number of instructions executed in the program or collection of programs. Semiconductor scientists and engineers are continually making it possible for microprocessors to run at faster clock frequencies, chiefly by reducing transistor size, resulting in faster switching times. The number of instructions executed is largely fixed by the task to be performed by the program, although it is also affected by the instruction set architecture of the microprocessor. Large performance increases have been realized by architectural and organizational notions that improve the instructions per clock cycle, in particular by notions of parallelism.

One notion of parallelism that has improved the instructions per clock cycle, as well as the clock frequency, of microprocessors is pipelining, which overlaps execution of multiple instructions within pipeline stages of the microprocessor. In an ideal situation, each clock cycle one instruction moves down the pipeline to a new stage, which performs a different function on the instructions. Thus, although each individual instruction takes multiple clock cycles to complete, because the multiple cycles of the individual instructions overlap, the average clocks per instruction is reduced. The performance improvements of pipelining may be realized to the extent that the instructions in the program permit it, namely to the extent that an instruction does not depend upon its predecessors in order to execute and can therefore execute in parallel with its predecessors, which is commonly referred to as instruction-level parallelism. Another way in which instruction-level parallelism is exploited by contemporary microprocessors is the issuing of multiple instructions for execution per clock cycle, commonly referred to as superscalar microprocessors.

What has been discussed above pertains to parallelism at the individual instruction-level. However, the performance improvement that may be achieved through exploitation of instruction-level parallelism is limited. Various constraints imposed by limited instruction-level parallelism and other performance-constraining issues have recently renewed an interest in exploiting parallelism at the level of blocks, or sequences, or streams of instructions, commonly referred to as thread-level parallelism. A thread is simply a sequence, or stream, of program instructions. A multithreaded microprocessor concurrently executes multiple threads according to some scheduling policy that dictates the fetching and issuing of instructions of the various threads, such as interleaved, blocked, or simultaneous multithreading. A multithreaded microprocessor typically allows the multiple threads to share the functional units of the microprocessor (e.g., instruction fetch and decode units, caches, branch prediction units, and load/store, integer, floating-point, SIMD, etc. execution units) in a concurrent fashion. However, multithreaded microprocessors include multiple sets of resources, or contexts, for storing the unique state of each thread, such as multiple program counters and general purpose register sets, to facilitate the ability to quickly switch between threads to fetch and issue instructions.

One example of a performance-constraining issue addressed by multithreading microprocessors is the fact that accesses to memory outside the microprocessor that must be performed due to a cache miss typically have a relatively long latency. It is common for the memory access time of a contemporary microprocessor-based computer system to be between one and two orders of magnitude greater than the cache hit access time. Consequently, while the pipeline is stalled waiting for the data from memory, some or all of the pipeline stages of a single-threaded microprocessor may be idle performing no useful work for many clock cycles. Multithreaded microprocessors may solve this problem by issuing instructions from other threads during the memory fetch latency, thereby enabling the pipeline stages to make forward progress performing useful work, somewhat analogously to, but at a finer level of granularity than, an operating system performing a task switch on a page fault. Other examples are pipeline stalls and their accompanying idle cycles due to a branch misprediction and concomitant pipeline flush, or due to a data dependence, or due to a long latency instruction such as a divide instruction. Again, the ability of a multithreaded microprocessor to issue instructions from other threads to pipeline stages that would otherwise be idle may significantly reduce the time required to execute the program or collection of programs comprising the threads. Another problem, particularly in embedded systems, is the wasted overhead associated with interrupt servicing. Typically, when an input/output device signals an interrupt event to the microprocessor, the microprocessor switches control to an interrupt service routine, which requires saving of the current program state, servicing the interrupt, and restoring the current program state after the interrupt has been serviced. A multithreaded microprocessor provides the ability for event service code to be its own thread having its own context. Consequently, in response to the input/output device signaling an event, the microprocessor can quickly—perhaps in a single clock cycle—switch to the event service thread, thereby avoiding incurring the conventional interrupt service routine overhead.

Just as the degree of instruction-level parallelism dictates the extent to which a microprocessor may take advantage of the benefits of pipelining and superscalar instruction issue, the degree of thread-level parallelism dictates the extent to which a microprocessor may take advantage of multithreaded execution. An important characteristic of a thread is its independence of the other threads being executed on the multithreaded microprocessor. A thread is independent of another thread to the extent its instructions do not depend on instructions in other threads. The independent characteristic of threads enables the microprocessor to execute the instructions of the various threads concurrently. That is, the microprocessor may issue instructions of one thread to execution units without regard for the instructions being issued of other threads. To the extent that the threads access common data, the threads themselves must be programmed to synchronize data accesses with one another to insure proper operation such that the microprocessor instruction issue stage does not need to be concerned with the dependences.

As may be observed from the foregoing, a processor concurrently executing multiple threads may reduce the time required to execute a program or collection of programs comprising the multiple threads. However, there is an overhead associated with the creation and dispatch of a new thread of execution. That is, the microprocessor must expend useful time performing the necessary functions to create a new thread—typically allocating context for the new thread and copying the parent thread's context to the new thread's context—and scheduling the new thread for execution, i.e., determining when the microprocessor will begin to fetch and issue instructions from the new thread. The overhead time is analogous to the task-switching overhead of a multitasking operating system and does not contribute to performing the actual task to be accomplished by the program or collection of programs, such as multiplying matrices or processing a packet received from a network or rendering an image. Consequently, although in theory executing multiple threads in parallel may improve the microprocessor's performance, the extent of the performance improvement is limited by the overhead of creating a new thread. Stated alternatively, the larger the thread creation overhead, the greater the amount of useful work that must be performed by the new thread to amortize the cost of the thread creation. For threads that have a relatively large execution time, the thread creation overhead may be essentially irrelevant to performance. However, some applications may benefit from threads with relatively short execution times that are created relatively frequently, in which case the thread creation overhead must be small in order to realize substantial performance gains from multithreading. Therefore, what is needed is a multithreaded microprocessor having in its instruction set a lightweight thread creation instruction.

BRIEF SUMMARY OF THE INVENTION

The present invention provides a single instruction in a multithreaded microprocessor instruction set, which when executed, allocates a thread context for a new thread and schedules execution of the new thread. In one embodiment, the instruction occupies a single instruction issue slot in the microprocessor in RISC-like fashion. The instruction has very low overhead because it foregoes copying the entire parent thread context to the new thread, which would require either a long amount of time if the context were copied sequentially, or would require an enormous data path and multiplexing logic if copied in parallel. Instead, the instruction includes a first operand which is an initial instruction fetch address that gets stored into the program counter of the new thread context and a second operand that gets stored into one of the registers of the register set of the new thread context, such as one of the general purpose registers. The second operand may be used by the new thread as a pointer to a data structure in memory that contains information needed by the new thread, such as initial general purpose register set values. The second operand enables the new thread to populate only the registers needed by the new thread by loading them from the data structure. This is advantageous since the present inventor has noted that many new threads require only between one to five registers to be populated. Many contemporary microprocessors include 32 general purpose registers, for example; hence, in the typical case the present microprocessor avoids the wasted effort of copying the entire parent thread register set to the new thread register set.

In one embodiment, the instruction includes a third operand that specifies which of the registers in the new thread context is to receive the second operand. In one embodiment, the instruction is executable by user-mode code advantageously avoiding the need for operating system involvement to create a thread in the typical case. Another advantage of having a single instruction that performs new thread context allocation and new thread scheduling is that it preserves precious opcode space in the instruction set over implementations that require multiple instructions to create and schedule a new thread. The present instruction is able to perform both functions in a single instruction by raising an exception to the instruction if no free thread context is available for allocation when the instruction is executed.

In one aspect, the present invention provides an instruction for execution on a microprocessor configured to execute concurrent program threads. The instruction includes an opcode for instructing the microprocessor to allocate resources for a new thread and to schedule execution of the new thread on the microprocessor. The resources comprise a program counter and a register set. The instruction also includes a first operand, for specifying an initial instruction fetch address to be stored into the program counter allocated for the new thread. The instruction also includes a second operand for storing in a register of the register set allocated for the new thread.

In another aspect, the present invention provides a multithreaded microprocessor. The microprocessor includes a plurality of thread contexts, each configured to store state of a thread and to indicate whether the thread context is available for allocation. The microprocessor also includes a scheduler, coupled to the plurality of thread contexts, for allocating one of the plurality of thread contexts to a new thread and scheduling the new thread for execution, in response to a single instruction in a currently executing thread. The microprocessor takes an exception to the single instruction if none of the plurality of thread contexts is available for allocation.

In another aspect, the present invention provides a multithreaded microprocessor. The microprocessor includes a first program counter, for storing a fetch address of an instruction in a first program thread. The microprocessor also includes a first register set, including first and second registers specified by the instruction for storing first and second operands, respectively. The first operand specifies a fetch address of a second program thread. The microprocessor also includes a second program counter, coupled to the first register set, for receiving the first operand from the first register in response to the instruction. The microprocessor also includes a second register set, coupled to the first register set, including a third register, for receiving the second operand from the second register in response to the instruction. The microprocessor also includes a scheduler, coupled to the first and second register set, for causing the microprocessor to fetch and execute instructions from the second program thread initial fetch address stored in the second program counter in response to the instruction.

In another aspect, the present invention provides a method for creating a new thread of execution on a multithreaded microprocessor. The method includes decoding a single instruction executing in a first program thread and allocating for a second program thread a program counter and register set of the microprocessor, in response to decoding the instruction. The method also includes storing a first operand of the instruction into a register of the register set, in response to allocating the program counter and register set for the second program thread. The method also includes storing a second operand of the instruction into the program counter, in response to allocating the program counter and register set for the second program thread. The method also includes scheduling the second program thread for execution on the microprocessor, after storing the first and second operand.

In another aspect, the present invention provides a multithreaded processing system. The system includes a memory configured to store a fork instruction of a first thread and a data structure. The fork instruction specifies a register storing a memory address of the data structure and an initial instruction address of a second thread. The data structure includes initial general purpose register values of the second thread. The system also includes a microprocessor, coupled to the memory. The microprocessor allocates a free thread context for the second thread, stores the second thread initial instruction address into a program counter of the thread context, stores the data structure memory address into a register of the thread context, and schedules the second thread for execution, in response to the fork instruction.

In another aspect, the present invention provides a computer program product for use with a computing device. The computer program product includes a computer usable medium, having computer readable program code embodied in the medium, for causing a multithreaded microprocessor. The computer readable program code includes first program code for providing a first program counter, for storing a fetch address of an instruction in a first program thread. The computer readable program code also includes second program code for providing a first register set, including first and second registers specified by the instruction for storing first and second operands, respectively. The first operand specifies a fetch address of a second program thread. The computer readable program code also includes third program code for providing a second program counter, coupled to the first register set, for receiving the first operand from the first register in response to the instruction. The computer readable program code also includes fourth program code for providing a second register set, coupled to the first register set, including a third register, for receiving the second operand from the second register in response to the instruction. The computer readable program code also includes fifth program code for providing a scheduler, coupled to the first and second register set, for causing the microprocessor to fetch and execute instructions from the second program thread initial fetch address stored in the second program counter in response to the instruction.

In another aspect, the present invention provides a computer data signal embodied in a transmission medium, including computer-readable program code for providing a multithreaded microprocessor for executing a fork instruction. The program code includes first program code for providing an opcode, for instructing the microprocessor to allocate resources for a new thread and to schedule execution of the new thread on the microprocessor. The resources comprise a program counter and a register set. The program code also includes second program code for providing a first operand, for specifying an initial instruction fetch address to be stored into the program counter allocated for the new thread. The program code also includes third program code for providing a second operand, for storing in a register of the register set allocated for the new thread.

BRIEF DESCRIPTION OF THE DRAWINGS/FIGURES

DETAILED DESCRIPTION OF THE INVENTION

Figure 1:
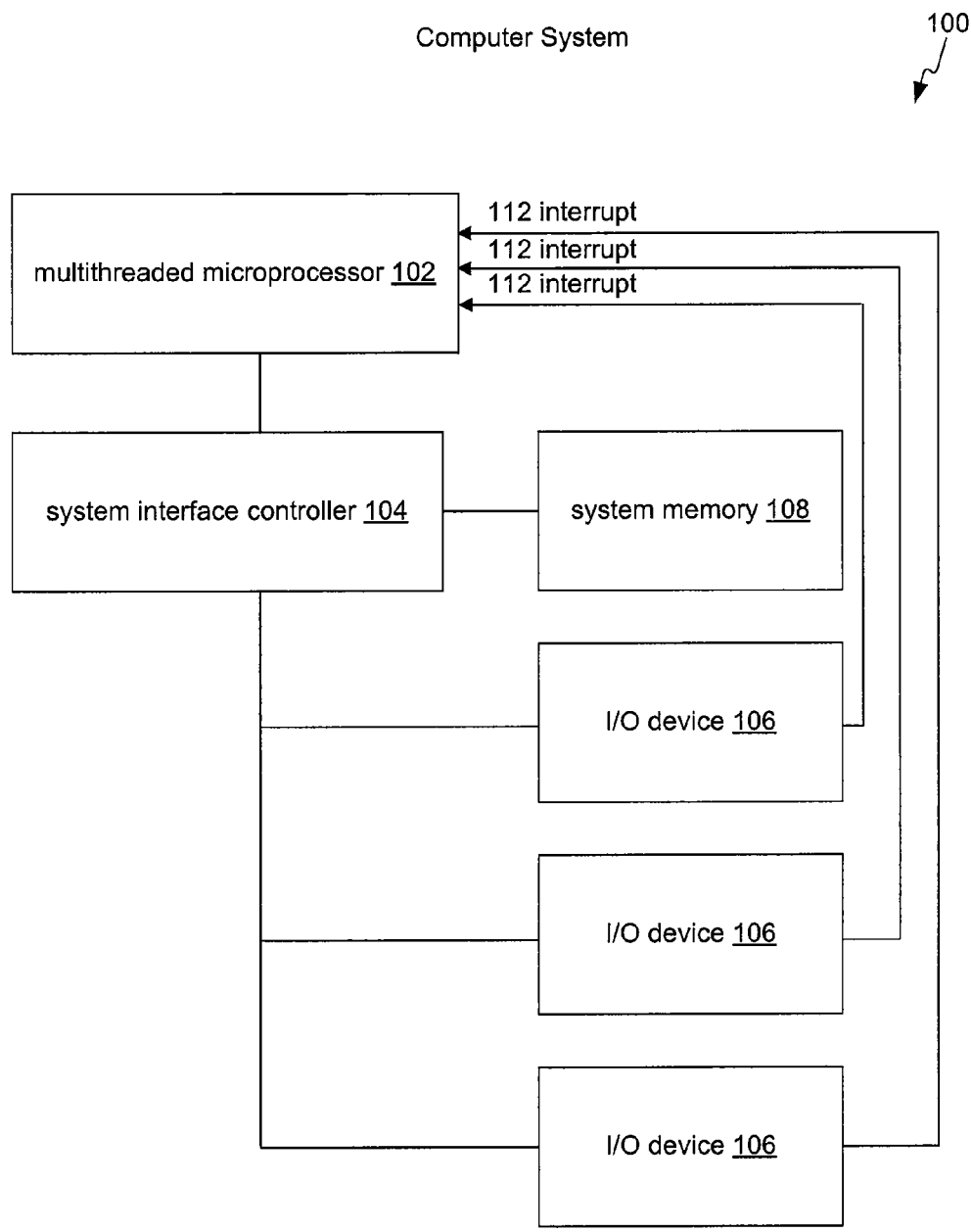
FIG. 1 is a block diagram illustrating a computer system according to the present invention.

Referring now to FIG. 1, a block diagram illustrating a computer system 100 according to the present invention is shown. The computer system 100 includes a multithreaded microprocessor 102 coupled to a system interface controller 104. The system interface controller is coupled to a system memory 108 and a plurality of input/output (I/O) devices 106. Each of the I/O devices 106 provides an interrupt request line 112 to the microprocessor 102. The computer system 100 may be, but is not limited to, a general purpose programmable computer system, server computer, workstation computer, personal computer, notebook computer, personal digital assistant (PDA), or embedded system such as, but not limited to, a network router or switch, printer, mass storage controller, camera, scanner, automobile controller, and the like.

The system memory 108 includes memory, such as RAM and ROM memory, for storing program instructions for execution on the microprocessor 102 and for storing data to be processed by the microprocessor 102 according to the program instructions. The program instructions may comprise a plurality of program threads that the microprocessor 102 executes concurrently. A program thread, or thread, comprises a sequence, or stream, of executed program instructions and the associated sequence of state changes in the microprocessor 102 associated with the execution of the sequence of instructions. The sequence of instructions typically, but not necessarily, includes one or more program control instructions, such as a branch instruction. Consequently, the instructions may or may not have consecutive memory addresses. The sequence of instructions comprising a thread is from a single program. In particular, the microprocessor 102 is configured to execute a FORK instruction for creating a new program thread, i.e., for allocating the resources of the microprocessor 102 needed to execute a thread and for scheduling the thread for execution on the microprocessor 102, as described in detail below.

The system interface controller 104 interfaces with the microprocessor 102 via a processor bus coupling the microprocessor 102 to the system interface controller 104. In one embodiment, the system interface controller 104 includes a memory controller for controlling the system memory 108. In one embodiment, the system interface controller 104 includes a local bus interface controller for providing a local bus, such as for example a PCI bus, to which the I/O devices 106 are coupled.

The I/O devices 106 may include, but are not limited to, user input devices such as keyboards, mice, scanners and the like; display devices such as monitors, printers and the like; storage devices such as disk drives, tape drives, optical drives and the like; system peripheral devices such as direct memory access controllers (DMAC), clocks, timers, I/O ports and the like; network devices such as media access controllers (MAC) for Ethernet, FibreChannel, Infiniband, or other high-speed network interfaces; data conversion devices such as analog-to-digital (A/D) converters and digital-to-analog converters; and so forth. The I/O devices 106 generate the interrupt signals 112 to the microprocessor 102 to request service. Advantageously, the microprocessor 102 is capable of concurrently executing multiple program threads for processing the events signified on the interrupt request lines 112 without requiring the conventional overhead associated with saving the state of the microprocessor 102, transferring control to an interrupt service routine, and restoring state upon completion of the interrupt service routine.

In one embodiment, the computer system 100 comprises a multiprocessing system comprising a plurality of the multithreaded microprocessors 102. In one embodiment, each microprocessor 102 provides two distinct, but not mutually-exclusive, multithreading capabilities. First, each microprocessor 102 includes a plurality of logical processor contexts, each of which appears to an operating system as an independent processing element, referred to herein as a virtual processing element (VPE), through the sharing of resources in the microprocessor 102. To the operating system, an N VPE microprocessor 102 appears like an N-way symmetric multiprocessor (SMP), which allows existing SMP-capable operating systems to manage the plurality of VPEs. Second, each VPE may also contain a plurality of thread contexts for simultaneously executing a plurality of threads. Consequently, the microprocessor 102 also provides a multithreaded programming model wherein threads can be created and destroyed without operating system intervention in typical cases, and where system service threads can be scheduled in response to external conditions (e.g., input/output service event signals) with zero interrupt latency.

Figure 2:
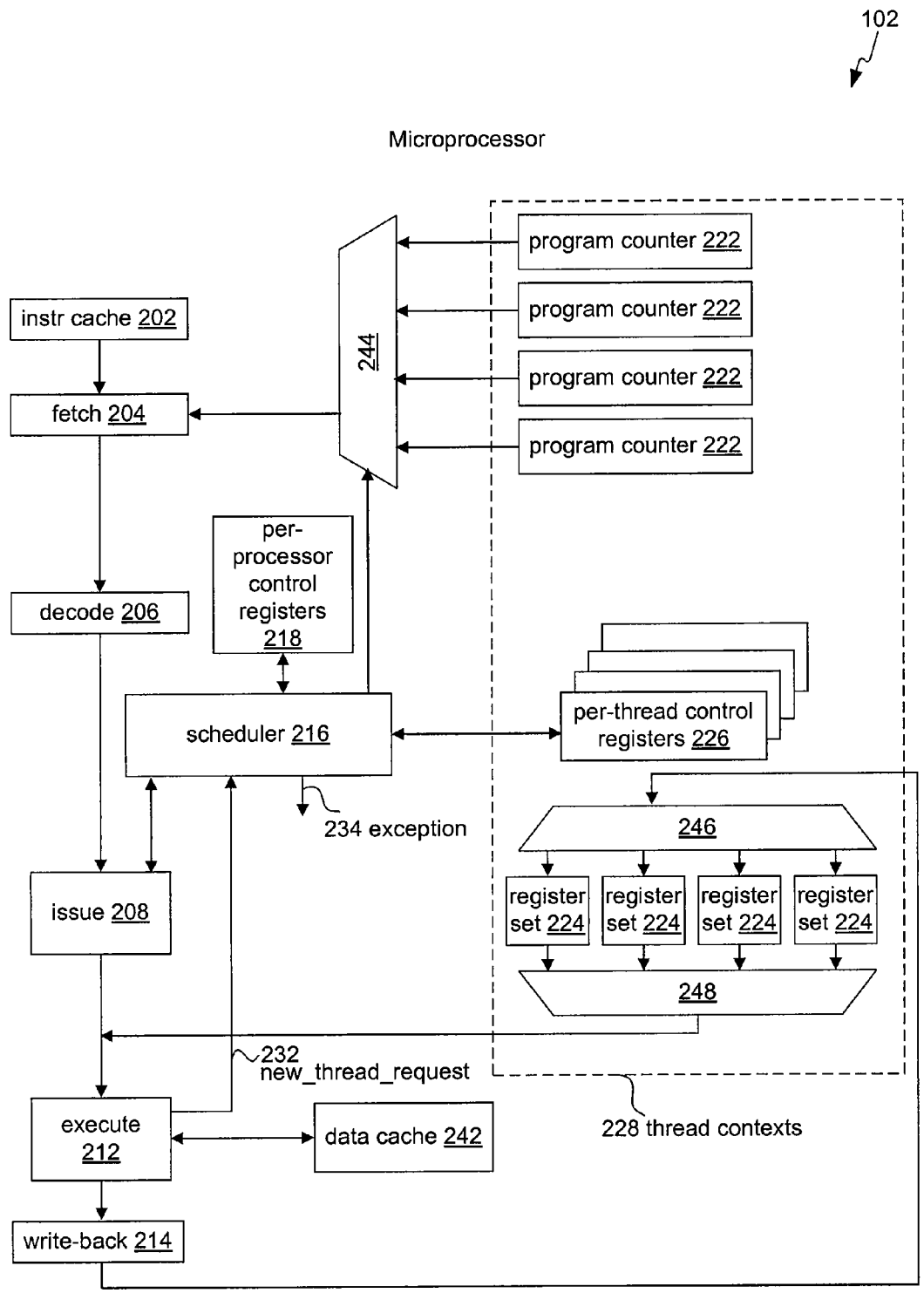
FIG. 2 is a block diagram illustrating the multithreaded microprocessor of the computer system of FIG. 1 according to the present invention.

Referring now to FIG. 2, a block diagram illustrating the multithreaded microprocessor 102 of the computer system 100 of FIG. 1 according to the present invention is shown. The microprocessor 102 is a pipelined microprocessor comprising a plurality of pipeline stages. The microprocessor 102 includes a plurality of thread contexts 228 for storing state associated with a plurality of threads. A thread context 228 comprises a collection of registers and/or bits in registers of the microprocessor 102 that describe the state of execution of a thread. In one embodiment, a thread context 228 comprises a register set 224 (such as a set of general purpose registers (GPRs)), a program counter (PC) 222, and per-thread control registers 226. The contents of portions of the per-thread control registers 226 are described in more detail below. The embodiment of FIG. 2 shows four thread contexts 228 each comprising a program counter 222, register set 224, and per-thread control registers 226. In one embodiment, a thread context 228 also includes a multiplier result register. In one embodiment, the register sets 224 each have two read ports and one write port for supporting a read from each of two registers and a write to one register in a register set 224 during a single clock cycle. As described below, the FORK instruction 300 includes two source operands and one destination operand. Consequently, the microprocessor 102 is capable of executing the FORK instruction 300 in a single clock cycle.

In contrast to a thread context 228, the microprocessor 102 also maintains a processor context, which is a larger collection of state of the microprocessor 102. In the embodiment of FIG. 2, the processor context is stored in per-processor control registers 218. Each VPE includes its own set of per-processor control registers 218. In one embodiment, one of the per-processor control registers 218 includes a status register with a field specifying the most recently dispatched thread exception raised by exception signal 234. In particular, if a VPE issues a FORK instruction 300 of a current thread but there are no free allocatable thread contexts 228 to allocate to a new thread, then the exception field will indicate a Thread Overflow condition. In one embodiment, the microprocessor 102 substantially conforms to a MIPS32 or MIPS64 Instruction Set Architecture (ISA), and the per-processor control registers 218 substantially conform to registers for storing processor context of a MIPS Privileged Resource Architecture (PRA), such as the mechanisms necessary for an operating system to manage the resources of the microprocessor 102, such as virtual memory, caches, exceptions and user contexts.

The microprocessor 102 includes a scheduler 216 for scheduling execution of the various threads being concurrently executed by the microprocessor 102. The scheduler 216 is coupled to the per-thread control registers 226 and to the per-processor control registers 218. In particular, the scheduler 216 is responsible for scheduling fetching of instructions from the program counter 222 of the various threads and for scheduling issuing of the fetched instructions to execution units of the microprocessor 102, as described below. The scheduler 216 schedules execution of the threads based on a scheduling policy of the microprocessor 102. The scheduling policy may include, but is not limited to, any of the following scheduling policies. In one embodiment, the scheduler 216 employs a round-robin, or time-division-multiplexed, or interleaved, scheduling policy that allocates a predetermined number of clock cycles or instruction issue slots to each ready thread in a rotating order. The round-robin policy is useful in an application in which fairness is important and a minimum quality of service is required for certain threads, such as real-time application program threads. In one embodiment, the scheduler 216 employs a blocking scheduling policy wherein the scheduler 216 continues to schedule fetching and issuing of a currently running thread until an event occurs that blocks further progress of the thread, such as a cache miss, a branch misprediction, a data dependency, or a long latency instruction. In one embodiment, the microprocessor 102 comprises a superscalar pipelined microprocessor, and the scheduler 216 schedules the issue of multiple instructions per clock cycle, and in particular, the issue of instructions from multiple threads per clock cycle, commonly referred to as simultaneous multithreading.

Figure 3:
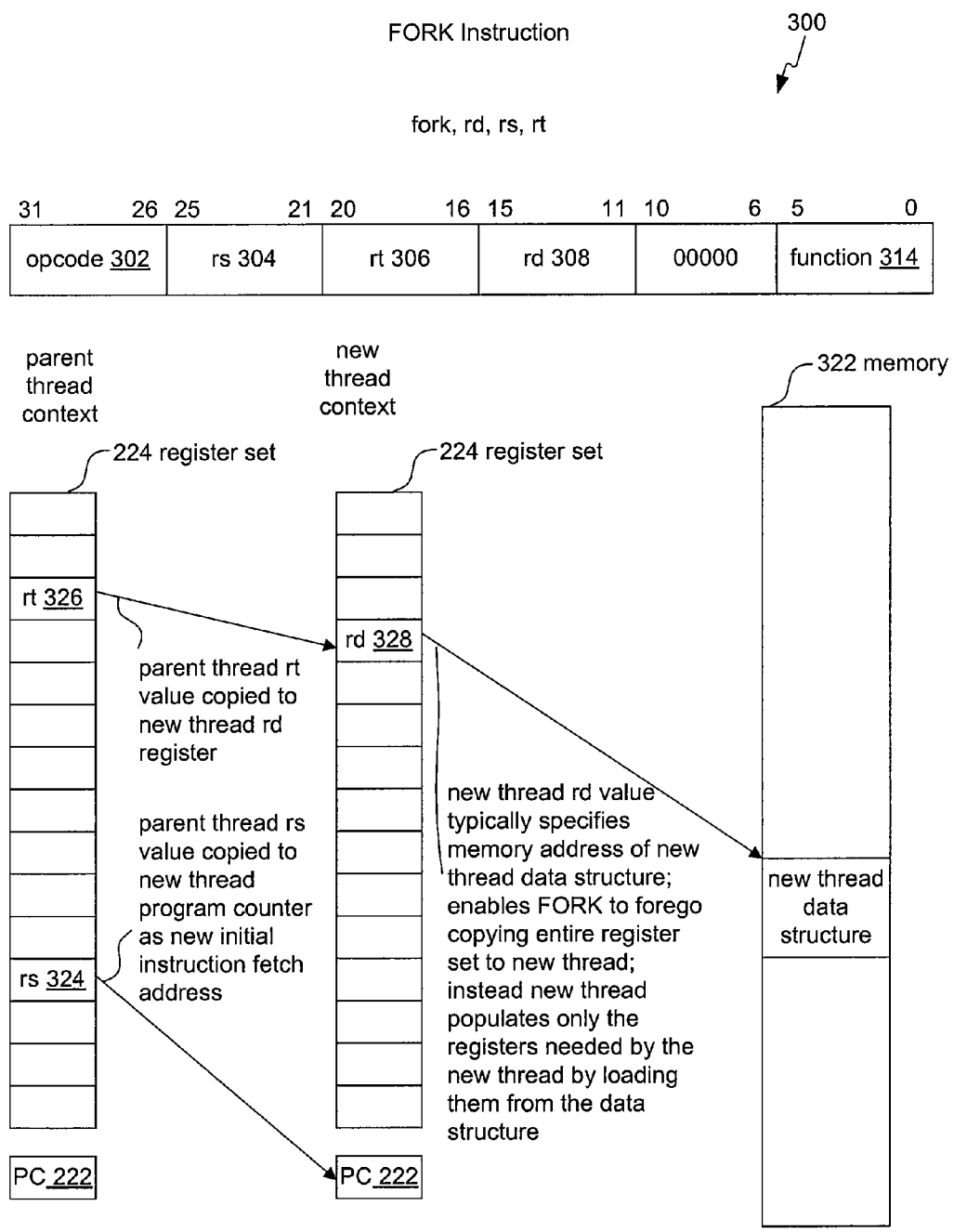
FIG. 3 is a block diagram illustrating a FORK instruction executed by the microprocessor of FIG. 2 according to the present invention.

The microprocessor 102 includes an instruction cache 202 for caching program instructions fetched from the system memory 108 of FIG. 1, such as the FORK instruction 300 of FIG. 3. In one embodiment, the microprocessor 102 provides virtual memory capability, and the fetch unit 204 includes a translation lookaside buffer for caching physical to virtual memory page translations. In one embodiment, each program, or task, executing on the microprocessor 102 is assigned a unique task ID, or address space ID (ASID), which is used to perform memory accesses and in particular memory address translations, and a thread context 228 also includes storage for an ASID associated with the thread. In one embodiment, when a parent thread executes a FORK instruction 300 to create a new thread, the new thread inherits the ASID and address space of the parent thread. In one embodiment, the various threads executing on the microprocessor 102 share the instruction cache 202 and translation lookaside buffer. In another embodiment, each thread includes its own translation lookaside buffer.

The microprocessor 102 also includes a fetch unit 204, coupled to the instruction cache 202, for fetching program instructions, such as a FORK instruction 300, from the instruction cache 202 and the system memory 108. The fetch unit 204 fetches instructions at an instruction fetch address provided by a multiplexer 244. The multiplexer 244 receives a plurality of instruction fetch addresses from a corresponding plurality of program counters 222. Each of the program counters 222 stores a current instruction fetch address for a different program thread. The embodiment of FIG. 2 illustrates four different program counters 222 associated with four different threads. The multiplexer 244 selects one of the four program counters 222 based on a selection input provided by the scheduler 216. In one embodiment, the various threads executing on the microprocessor 102 share the fetch unit 204.

The microprocessor 102 also includes a decode unit 206, coupled to the fetch unit 204, for decoding program instructions fetched by the fetch unit 204, such as a FORK instruction 300. The decode unit 206 decodes the opcode, operand, and other fields of the instructions. In one embodiment, the various threads executing on the microprocessor 102 share the decode unit 206.

The microprocessor 102 also includes execution units 212 for executing instructions. The execution units 112 may include but are not limited to one or more integer units for performing integer arithmetic, Boolean operations, shift operations, rotate operations, and the like; floating point units for performing floating point operations; load/store units for performing memory accesses and in particular accesses to a data cache 242 coupled to the execution units 212; and a branch resolution unit for resolving the outcome and target address of branch instructions. In one embodiment, the data cache 242 includes a translation lookaside buffer for caching physical to virtual memory page translations. In addition to the operands received from the data cache 242, the execution units 212 also receive operands from registers of the register sets 224. In particular, an execution unit 212 receives operands from a register set 224 of the thread context 228 allocated to the thread to which the instruction belongs. A multiplexer 248 selects operands from the appropriate register set 224 for provision to the execution units 212 based on the thread context 228 of the instruction being executed by the execution unit 212. In one embodiment, the various execution units 212 may concurrently execute instructions from multiple concurrent threads.

One of the execution units 212 is responsible for executing a FORK instruction 300 and generates a true value on a new_thread_request signal 232, which is provided to the scheduler 216, in response to being issued a FORK instruction 300. The new_thread_request signal 232 requests the scheduler 216 to allocate a new thread context 228 and to schedule for execution the new thread associated with the new thread context 228. As described in more detail below, if a new thread context 228 is requested for allocation, but no free allocatable threads are available, the scheduler 216 generates a true value on an exception signal 234 to raise an exception to the FORK instruction 300. In one embodiment, the scheduler 216 maintains a count of the number of free allocatable thread contexts 228, and if the number is less than zero when a new_thread_request 232 is made, the scheduler 216 raises an exception 234 to the FORK instruction 300. In another embodiment, the scheduler 216 examines status bits in the per-thread control registers 226 when a new_thread_request 232 is made to determine whether a free allocatable thread context 228 is available.

The microprocessor 102 also includes an instruction issue unit 208, coupled to the scheduler 216 and coupled between the decode unit 206 and the execution units 212, for issuing instructions to the execution units 212 as instructed by the scheduler 216 and in response to information about the instructions decoded by the decode unit 206. In particular, the instruction issue unit 208 insures that instructions are not issued to the execution units 212 if they have data dependencies on other instructions previously issued to the execution units 212. In one embodiment, an instruction queue is imposed between the decode unit 206 and the instruction issue unit 208 for buffering instructions awaiting issue to the execution units 212 for reducing the likelihood of starvation of the execution units 212. In one embodiment, the various threads executing on the microprocessor 102 share the instruction issue unit 208.

The microprocessor 102 also includes a write-back unit 214, coupled to the execution units 212, for writing back results of completed instructions into the register sets 224. A demultiplexer 246 receives the instruction result from the write-back unit 214 and stores the instruction result into the appropriate register set 224 associated with the competed instruction's thread.

Referring now to FIG. 3, a block diagram illustrating a FORK instruction 300 executed by the microprocessor 102 of FIG. 2 according to the present invention is shown. The mnemonic for the FORK instruction 300 is fork rd, rs, rt as shown, wherein rd, rs, and rt are three operands of the FORK instruction 300. FIG. 3 illustrates the various fields of the FORK instruction 300. Bits 26-31 are an opcode field 302 and bits 0-5 are a function field 314. In one embodiment, the opcode field 302 indicates the instruction is a SPECIAL3 type instruction within the MIPS ISA, and the function field 314 indicates the function is a FORK instruction. Hence, the decode unit 206 of FIG. 2 examines the opcode field 302 and the function field 314 to determine the instruction is a FORK instruction 300. Bits 6-10 are reserved as zero.

Bits 21-25, 16-20, and 11-15 are an rs field 304, rt field 306, and rd field 308, respectively, which specify an rs register 324, rt register 326, and rd register 328, respectively, within one of the register sets 224 of FIG. 2. In one embodiment, each of the rs register 324, rt register 326, and rd register 328 is one of 32 general purpose registers of the MIPS ISA. The rs register 324 and rt register 326 are each one of the registers in the register set 224 allocated to the thread in which the FORK instruction 300 is included, referred to as the parent thread, or forking thread, or current thread. The rd register 328 is one of the registers in the register set 224 allocated to the thread which the FORK instruction 300 creates, referred to as the new thread, or child thread.

As shown in FIG. 3, the FORK instruction 300 instructs the microprocessor 102 to copy the value from the parent thread's rs register 324 to the new thread's program counter 222. The new thread's program counter 222 will be used as the initial instruction fetch address of the new thread.

Additionally, the FORK instruction 300 instructs the microprocessor 102 to copy the value from the parent thread's rt register 326 to the new thread's rd register 328. In typical program operation, the program will use the rd register 328 value as a memory address of a data structure for the new thread in memory 322. This enables the FORK instruction 300 to forego copying the entire register set 224 contents of the parent thread to the new thread register set 224, thereby advantageously making the FORK instruction 300 more lightweight and efficient, and executable within a single processor clock cycle. Instead, the new thread includes instructions to populate only the registers needed by the new thread by loading the register values from the data structure, which have a high probability of being present in the data cache 242. This is advantageous, since the present inventor has determined that many new threads typically only require between one and five registers to be populated, rather than the large number of registers typically found in many current microprocessors, such as the 32 general purpose registers of the MIPS ISA. Copying the entire register set 224 in a single clock cycle would require an unrealistically wide data path between each of the various thread contexts 228 in the microprocessor 102, and copying the entire register set 224 sequentially (e.g., one or two registers per clock cycle) would be much more time consuming and require more complexity in the microprocessor 102. However, the FORK instruction 300 advantageously executes in a RISC-fashion single clock cycle.

Advantageously, not only operating system software executing on the microprocessor 102 may employ the FORK instruction 300 to allocate resources for a new thread and to schedule execution of the new thread, but user level threads may also do so. This fact is particularly advantageous for programs that may create and terminate relatively short threads relatively frequently. For example, a program that includes large numbers of loops with short loop bodies and no data dependence between iterations may benefit from the low thread creation overhead of the FORK instruction 300. Assume a code loop as follows:

```
for(i = 0; i<N; i++) {
    result[i] = FUNCTION(x[i], y[i]);
}
```

The lower the overhead of thread creation and destruction, the smaller the FUNCTION instruction sequence can be, and still be usefully parallelized into multiple threads. If the overhead associated with creating and destroying a new thread is on the order of 100 instructions, as might be the case with a conventional thread creation mechanism, then the FUNCTION must be many instructions long in order to obtain much benefit, if any, from parallelizing the loop into multiple threads. However, the fact that the FORK instruction 300 overhead is so small, in one embodiment only a single clock cycle, advantageously implies that even very short code regions can be profitably parallelized into multiple threads.

Although FIG. 3 shows only the copying of the rt register 326 and rs register 324 values from the parent thread context 228 to the new thread context 228, other state, or context, may also be copied in response to a FORK instruction 300, such as described below with respect to FIG. 4.

Figure 4:
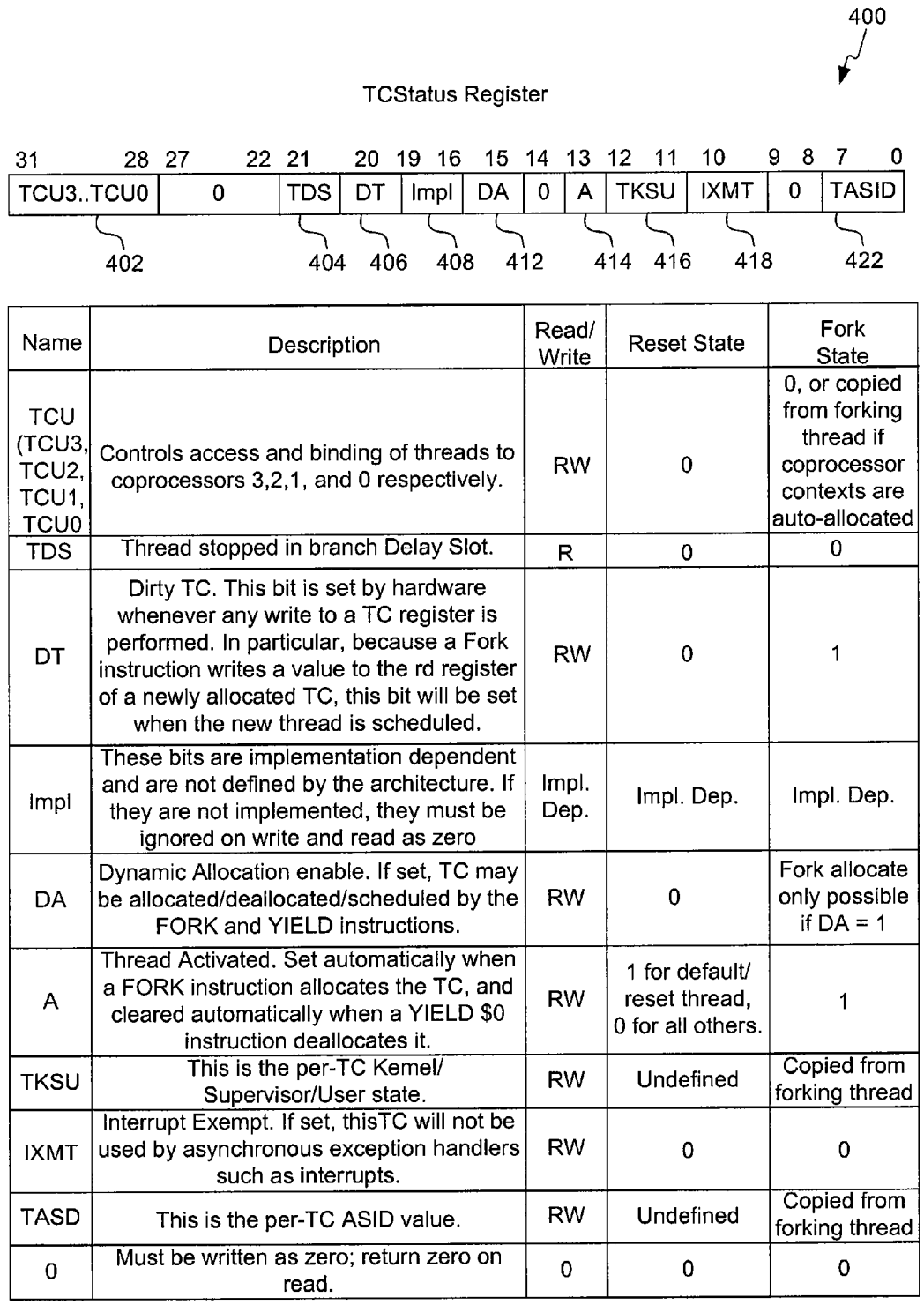
FIG. 4 is a block diagram illustrating one of the per-thread control registers of FIG. 2, a TCStatus Register, according to the present invention.

Referring now to FIG. 4, a block diagram illustrating one of the per-thread control registers 226 of FIG. 2, a TCStatus Register 400, according to the present invention is shown. That is, each thread context 228 includes a TCStatus Register 400. The various fields of the TCStatus Register 400 are described in the table in FIG. 4; however, particular fields distinctly related to the FORK instruction 300 will now be described in more detail.

The TCStatus Register 400 includes a TCU field 402. In one embodiment, the microprocessor 102 comprises a distinct processor core and one or more coprocessors, according to the MIPS ISA and PRA. The TCU field 402 controls whether the thread has access to and is bound to a particular coprocessor. In the embodiment of FIG. 4, the TCU field 402 allows for control of up to four coprocessors. In one embodiment, the FORK instruction 300 instructs the microprocessor 102 to copy the value of the TCU field 402 of the parent thread to the TCU field 402 of the new thread created by the FORK instruction 300.

The TCStatus Register 400 also includes a DT bit 406, which indicates whether or not the thread context 228 is dirty. The DT bit 406 may be employed by an operating system to insure security between different programs. For example, if thread contexts 228 are being dynamically allocated using FORK instructions 300 and deallocated using a YIELD instruction of the microprocessor 102 simultaneously in different security domains, i.e., by multiple applications or by both the operating system and an application program, a risk of information leakage in the form of register values inherited by an application exists, which must be managed by a secure operating system. The DT bit 406 associated with each thread context 228 can be cleared by software and is set by the microprocessor 102 whenever the thread context 228 is modified. The operating system may initialize all thread contexts 228 to a known clean state and clear all associated DT bits 406 prior to scheduling a task. When a task switch occurs, thread contexts 228 whose DT bit 406 is set must be scrubbed to a clean state before other tasks are allowed to allocate and use them. If a secure operating system wishes to make use of dynamic thread creation and allocation for privileged service threads, the associated thread contexts 228 must be scrubbed before they are freed for potential use by applications. The reader is referred to co-pending and concurrently filed U.S. patent application entitled INTEGRATED MECHANISM FOR SUSPENSION AND DEALLOCATION OF COMPUTATIONAL THREADS OF EXECUTION IN A PROCESSOR filed concurrently herewith, referred to at the beginning of the present Application, which describes in detail the YIELD instruction.

The TCStatus Register 400 also includes a DA status bit 412 that indicates whether or not the thread context 228 is dynamically allocatable and schedulable by a FORK instruction 300 and dynamically deallocatable by a YIELD instruction. In one embodiment, a portion of the thread contexts 228 are dynamically allocatable by a FORK instruction 300, and a portion of the thread contexts 228 are not dynamically allocatable by a FORK instruction 300, but are instead thread contexts 228 statically assigned to permanent threads of a program. For example, one or more thread contexts 228 may be statically assigned to portions of the operating system, rather than dynamically allocated by a FORK instruction 300. In another example, in an embedded application, one or more thread contexts 228 may be statically assigned to privileged service threads that in a conventional processor would function similarly to interrupt service routines for servicing interrupt sources that are known to be a vital portion of the application. For example, in a network router, one or more thread contexts 228 may be statically assigned to threads that handle events signaled by a set of I/O ports, which may generate an extremely large volume of events that may be handled efficiently by the single cycle thread switching of the microprocessor 102 described herein, but which might overwhelm another microprocessor that had to incur the overhead associated with taking an extremely large volume of interrupts and the associated state saving and transfer of control to an interrupt service routine.

In one embodiment, the DA bit 412 may be used by an operating system to handle sharing of thread contexts 228 among application programs. For example, a FORK instruction 300 may attempt to allocate a thread context 228 when there are no thread contexts 228 free for allocation, in which case the microprocessor 102 will raise a Thread Overflow exception 234 to the FORK instruction 300. In response, the operating system may save a copy of the current values, and then clear the DA bits 412 of all thread contexts 228. The next time a thread context 228 is deallocated by an application program, a Thread Underflow exception 234 will be raised, in response to which the operating system may restore the DA bits 412 saved in response to the Thread Overflow exception, and schedule a replay of the FORK instruction 300 that generated the original Thread Overflow exception.

The TCStatus Register 400 also includes an A bit 414, which indicates whether the thread associated with the thread context 228 is in an activated state. When a thread is in its activated state, the scheduler 216 will be scheduled to fetch and issue instructions from its program counter 222 according to the scheduler 216 scheduling policy. The scheduler 216 automatically sets the A bit 414 when a FORK instruction 300 dynamically allocates the thread context 228 and automatically clears the A bit 414 when a YIELD instruction dynamically deallocates a thread context 228. In one embodiment, when the microprocessor 102 is reset, one of the thread contexts 228 is designated as the reset thread context 228 for executing the initialization thread of the microprocessor 102. The A bit 414 of the reset thread context 228 is automatically set in response to a microprocessor 102 reset.

The TCStatus Register 400 also includes a TKSU field 416, which indicates the privilege state or level of the thread context 228. In one embodiment, the privilege may be one of three levels: kernel, supervisor, and user. In one embodiment, the FORK instruction 300 instructs the microprocessor 102 to copy the value of the TKSU field 416 of the parent thread to the TKSU field 416 of the new thread created by the FORK instruction 300.

The TCStatus Register 400 also includes a TASID field 422, which specifies the address space ID (ASID), or unique task ID, of the thread context 228. In one embodiment, the FORK instruction 300 instructs the microprocessor 102 to copy the value of the TASID field 422 of the parent thread to the TASID field 422 of the new thread created by the FORK instruction 300, such that the parent thread and new thread share the same address space.

In one embodiment, the per-thread control registers 226 also include a register for storing a halted bit for enabling software to halt a thread, i.e., to put the thread context 228 in a halted state, by setting the halted bit.

Figure 5:
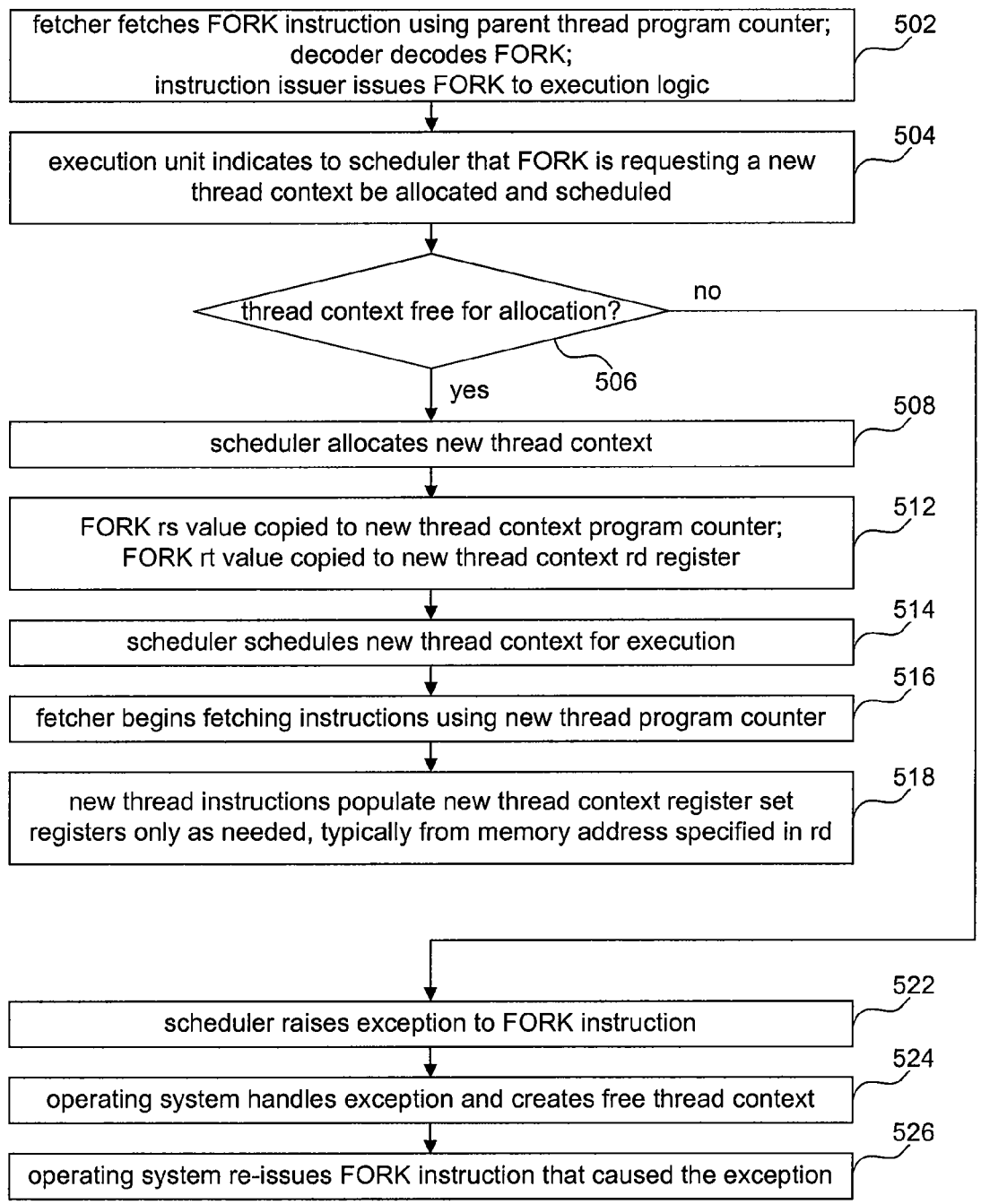
FIG. 5 is a flowchart illustrating operation of the microprocessor of FIG. 2 to execute the FORK instruction of FIG. 3 according to the present invention.

Referring now to FIG. 5, a flowchart illustrating operation of the microprocessor 102 of FIG. 2 to execute the FORK instruction 300 of FIG. 3 according to the present invention is shown. Flow begins at block 502.

At block 502, fetch unit 204 fetches a FORK instruction 300 using the program counter 222 of the current thread, the decode unit 206 decodes the FORK instruction 300, and the instruction issue unit 208 issues the FORK instruction 300 to an execution unit 212 of FIG. 2. Flow proceeds to block 504.

At block 504, the execution unit 212 indicates via the new_thread_request signal 232 that a FORK instruction 300 is requesting a new thread context 228 to be allocated and scheduled. Flow proceeds to decision block 506.

At decision block 506, the scheduler 216 determines whether a thread context 228 is free for allocation. In one embodiment, the scheduler 216 maintains a counter indicating the number of free allocatable thread contexts 228 which is incremented each time a YIELD instruction deallocates a thread context 228 and is decremented each time a FORK instruction 300 allocates a thread context 228, and the scheduler 216 determines whether a thread context 228 is free for allocation by determining whether the counter value is greater than zero. In another embodiment, the scheduler 216 examines the state bits in the per-thread control registers 226, such as the DA bit 412 and A bit 414 in the TCStatus Register 400 of FIG. 4 and the halted bit, to determine whether a thread context 228 is free for allocation. A thread context 228 is free for allocation if it is neither in an activated nor halted state, and is not a statically assigned thread context 228. If a thread context 228 is free for allocation, flow proceeds to block 508; otherwise, flow proceeds to block 522.

At block 508, the scheduler 216 allocates a free allocatable thread context 228 for the new thread in response to the FORK instruction 300. Flow proceeds to block 512.

At block 512, the rs register 324 value of the parent thread context 228 is copied to the program counter 222 of the new thread context 228, and the rt register 326 value of the parent thread context 228 is copied to the rd register 328 of the new thread context 228, as shown in FIG. 3, and other context related to the FORK instruction 300, such as described with respect to FIG. 4, is also copied from the parent thread context 228 to the new thread context 228. Flow proceeds to block 514.

At block 514, the scheduler 216 schedules the new thread context 228 for execution. That is, the scheduler 216 adds the thread context 228 to the list of thread contexts 228 that are currently ready for execution such that the fetch unit 204 may begin fetching and issuing instructions from the thread context's 228 program counter 222 subject to the constraints of the scheduling policy. Flow proceeds to block 516.

At block 516, the fetch unit 204 begins fetching instructions at the new thread context's 228 program counter 222. Flow proceeds to block 518.

At block 518, instructions of the new thread populate the register set 224 registers of the new thread context 228 as needed. As described above, typically the new thread's program instructions will populate the register set 224 from a data structure in memory specified by the rd register 328 value. Flow ends at block 518.

At block 522, the scheduler 216 raises a Thread Overflow exception 234 to the FORK instruction 300 to indicate that no thread contexts 228 were free for allocation when the FORK instruction 300 executed. Flow proceeds to block 524.

At block 524, an exception handler in the operating system creates a condition in which an allocatable thread context 228 may be freed for the FORK instruction 300, for example as described above with respect to the DA bit 412 of FIG. 4. Flow proceeds to block 526.

At block 526, the operating system re-issues the FORK instruction 300 that caused the exception 234 at block 522, which now succeeds due to the availability of a free allocatable thread context 228, for example as described above with respect to the DA bit 412 of FIG. 4. Flow ends at block 526.

Although the present invention and its objects, features, and advantages have been described in detail, other embodiments are encompassed by the invention. For example, although embodiments have been described in which the new thread context 228 is allocated on the same VPE as the parent thread context, in another embodiment, if the parent VPE detects that no free allocatable thread contexts are available on the VPE, the VPE attempts a remote FORK instruction on another VPE. In particular, the VPE determines whether another VPE has a free allocatable thread context and has the same address space as the parent thread context, and if so, sends a FORK instruction information packet to the other VPE to enable the other VPE to allocate and schedule the free thread context. In addition, the FORK instruction described herein is not limited to use on a microprocessor that executes multiple threads concurrently to solve a particular latency event, but may be executed on microprocessors that multi-thread on cache misses, mispredicted branches, long latency instructions, etc. Furthermore, the FORK instruction described herein may execute on scalar or superscalar microprocessors. Additionally, the FORK instruction described herein may execute on a microprocessor with any of various scheduling policies. Still further, although an embodiment of the FORK instruction has been described in which the rt value is copied to a register of the new thread context, other embodiments are contemplated in which the rt value is provided to the new thread context via other means, such as via memory. Finally although embodiments have been described in which the operands of the FORK instruction are stored in general purpose registers, in other embodiments the operands may be stored via other means, such as via a memory or via a non-general purpose register. For example, although embodiments have been described in which the microprocessor is a register-based processor, other embodiments are contemplated in which the processor is a stack-based processor, such as a processor configured to efficiently execute Java virtual machine code. In such embodiments, the operands of the FORK instruction may be specified in an operand stack in memory rather than in a register. For example, each thread context may include a stack pointer register, and fields of the FORK instruction may specify offsets of the FORK operands into the stack memory relative to the stack pointer register value, rather than specifying registers in the microprocessor's register space.

In addition to implementations of the invention using hardware, the invention can be embodied in software (e.g., computer readable code, program code, instructions and/or data) disposed, for example, in a computer usable (e.g., readable) medium. Such software enables the function, fabrication, modeling, simulation, description and/or testing of the apparatus and method described herein. For example, this can be accomplished through the use of general programming languages (e.g., C, C++, JAVA, etc.), GDSII databases, hardware description languages (HDL) including Verilog HDL, VHDL, and so on, or other available programs, databases, and/or circuit (i.e., schematic) capture tools. Such software can be disposed in any known computer usable (e.g., readable) medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. It is understood that the invention can be embodied in software (e.g., in HDL as part of a semiconductor intellectual property core, such as a microprocessor core, or as a system-level design, such as a System on Chip or SOC) and transformed to hardware as part of the production of integrated circuits. Also, the invention may be embodied as a combination of hardware and software.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A multiprocessing system comprising:
a multithreaded microprocessor having a plurality of logical processor contexts each of which appears to an N-way symmetric multiprocessor (SMP) operating system executing on the multithreaded microprocessor as a multithreaded virtual processing element (VPE),
wherein the SMP operating system manages a simultaneously executing plurality of threads that can be created and destroyed without operating system intervention,
wherein threads can be scheduled in response to external conditions with no interrupt latency, and
wherein each thread context comprises a result register having two read ports and one write port for supporting execution of an instruction that performs exactly two reads, one from a first operand register containing a first operand and one from a second operand register containing a second operand and a single write of the second operand to one destination register in a register set during a single clock cycle.

2. The multiprocessing system of claim 1, wherein threads scheduled in response to external conditions are system service threads.

3. The multiprocessing system of claim 1, wherein each thread context comprises a collection of bits in registers that describe the execution state of a thread, ,a program counter (PC) and a per-thread control register.

4. The multiprocessing system of claim 1, further comprising a processor context, stored in per-processor control registers, associated with each VPE.

5. The multiprocessing system of claim 1, wherein each VPE comprises a set of per-processor control registers and a status register with a field for specifying a most recently dispatched thread exception raised by an exception signal, and wherein if a VPE issues an instruction to allocate resources for a new thread when free allocatable thread contexts are not available, a value in the exception field indicates a thread overflow condition.

6. A multiprocessing system comprising:
a multithreaded microprocessor having a plurality of logical processor contexts each of which appears to an N-way symmetric multiprocessor (SMP) operating system executing on the multithreaded microprocessor as a multithreaded virtual processing element (VPE),
wherein the SMP operating system manages a simultaneously executing plurality of threads that can be created and destroyed without operating system intervention,
wherein the execution of a single RISC-like instruction in a parent thread allocates resources for a new thread and schedules execution of the new thread, and
wherein each thread context comprises a result register having two read ports and one write port for supporting execution of an instruction that performs exactly two reads, one from a first operand register containing a first operand and one from a second operand register containing a second operand and a single write of the second operand to one destination register in a register set during a single clock cycle.

7. The multiprocessing system of claim 6, wherein the single RISC-like instruction is issued by the SMP operating system.

8. The multiprocessing system of claim 6, wherein the single RISC-like instruction is issued by a user level thread.

9. The multiprocessing system of claim 8, wherein very short code regions of user code are parallelized into multiple threads.

10. The multiprocessing system of claim 6, wherein the single RISC-like instruction transfers a value to a program counter associated with the new thread and transfers a value from a register in to define a location of a data structure for populating registers of the new thread.

11. The multiprocessing system of claim 6, wherein the single RISC-like instruction includes an opcode field that indicates the instruction is a SPECIAL3 type instruction within the MIPS ISA and a function field that indicates that the function is a FORK instruction.

* * * * *

UNITED STATES PATENT AND TRADEMARK OFFICE
CERTIFICATE OF CORRECTION

PATENT NO.       : 8,145,884 B2
APPLICATION NO.  : 12/605201
DATED            : March 27, 2012
INVENTOR(S)      : Kevin D. Kissell It is certified that error appears in the above-identified patent and that said Letters Patent is hereby corrected as shown below:

Column 16
Line 35, Claim 3, please replace "thread, ‚a" with --thread, a--.

Column 18
Line 2, Claim 10, please replace "register in to" with --register to--.

Signed and Sealed this
Twelfth Day of June, 2012

David J. Kappos
*Director of the United States Patent and Trademark Office*